United States Patent
Nikolovski et al.

(10) Patent No.: US 8,913,039 B2
(45) Date of Patent: Dec. 16, 2014

(54) METHOD AND DEVICE FOR LOCATING AT LEAST ONE TOUCH ON A TOUCH-SENSITIVE SURFACE OF AN OBJECT

(75) Inventors: Jean-Pierre Nikolovski, Chatenay-Malabry (FR); Moustapha Hafez, Arcueil (FR); Yuan Liu, Paris (FR); Nazih Mechbal, Paris (FR); Michel Verge, Paris (FR)

(73) Assignees: Commissariat a l'energie atomique et aux energies alternatives, Paris (FR); Centre National de la Recherche Scientifique, Paris (FR)

( * ) Notice: Subject to any disclaimer, the term of this patent is extended or adjusted under 35 U.S.C. 154(b) by 241 days.

(21) Appl. No.: 13/386,257

(22) PCT Filed: Jun. 30, 2010

(86) PCT No.: PCT/FR2010/051369
§ 371 (c)(1),
(2), (4) Date: Jan. 20, 2012

(87) PCT Pub. No.: WO2011/010037
PCT Pub. Date: Jan. 27, 2011

(65) Prior Publication Data
US 2012/0120014 A1    May 17, 2012

(30) Foreign Application Priority Data
Jul. 21, 2009   (FR) ...................... 09 55065

(51) Int. Cl.
*G09G 5/00* (2006.01)
*G06F 3/043* (2006.01)
*G06F 3/041* (2006.01)
*G06F 3/0488* (2013.01)

(52) U.S. Cl.
CPC ............ *G06F 3/0436* (2013.01); *G06F 3/0416* (2013.01); *G06F 3/04883* (2013.01); *G06F 2203/04808* (2013.01)
USPC ...................... 345/177; 178/18.04

(58) Field of Classification Search
CPC ........................................................ G09G 5/00
USPC .................. 345/173, 177; 178/18.03
See application file for complete search history.

(56) References Cited

U.S. PATENT DOCUMENTS 5,162,618 A * 11/1992 Knowles ................. 178/18.04
5,541,372 A *  7/1996 Baller et al. ............. 178/18.01
(Continued)

FOREIGN PATENT DOCUMENTS

WO    2009 147398    12/2009

OTHER PUBLICATIONS

French Search Report issued on Feb. 23, 2010 in FR 0955065 filed on Jul. 21, 2009.
(Continued)

*Primary Examiner* — Priyank Shah
(74) *Attorney, Agent, or Firm* — Oblon, Spivak, McClelland, Maier & Neustadt, L.L.P.

(57) ABSTRACT

This method for locating at least one touch on a touch-sensitive surface of an object comprises the following steps:
  monitoring (100) of at least one touch by propagating (102), in the touch-sensitive surface of the object, elastic mechanical waves from at least one transmitting point of the object, and by detecting (104) said elastic mechanical waves in at least one reception point of the object, in order to obtain at least one sensed signal, and
  locating (200) at least one touch on the touch-sensitive surface of the object by comparing certain spectral characteristics of the sensed signal to a set of reference characteristics.

The monitoring step (100) comprises measuring (104, 106) the sensed signal during a time interval ($t_3$) starting during a transient phase of the propagation of the transmitted waves, for supplying, to said at least one reception point, information on radiation interfered with by said at least one touch.

10 Claims, 4 Drawing Sheets

(56) References Cited

U.S. PATENT DOCUMENTS

| | | | |
|---|---|---|---|
| 5,637,839 A * | 6/1997 | Yamaguchi et al. | 178/18.04 |
| 6,396,484 B1 * | 5/2002 | Adler et al. | 345/177 |
| 6,741,237 B1 * | 5/2004 | Benard et al. | 345/173 |
| 7,277,087 B2 * | 10/2007 | Hill et al. | 345/173 |
| 8,217,917 B2 * | 7/2012 | Hill et al. | 345/177 |
| 8,519,982 B2 * | 8/2013 | Camp et al. | 345/177 |
| 2003/0066692 A1 * | 4/2003 | Devige et al. | 178/18.04 |
| 2004/0160421 A1 * | 8/2004 | Sullivan | 345/173 |
| 2004/0164970 A1 * | 8/2004 | Benard et al. | 345/177 |
| 2005/0012724 A1 * | 1/2005 | Kent | 345/177 |
| 2006/0097996 A1 * | 5/2006 | Tabata | 345/173 |
| 2006/0139339 A1 * | 6/2006 | Pechman et al. | 345/177 |
| 2006/0152499 A1 * | 7/2006 | Roberts | 345/173 |
| 2007/0109280 A1 * | 5/2007 | Sigona | 345/177 |
| 2008/0018618 A1 * | 1/2008 | Hill et al. | 345/177 |
| 2008/0198145 A1 * | 8/2008 | Knowles et al. | 345/177 |
| 2008/0231612 A1 * | 9/2008 | Hill et al. | 345/177 |
| 2010/0283745 A1 * | 11/2010 | Nikolovski et al. | 345/173 |
| 2011/0310028 A1 * | 12/2011 | Camp et al. | 345/173 |
| 2012/0200517 A1 * | 8/2012 | Nikolovski | 345/173 |

OTHER PUBLICATIONS

International Search Report issued on Sep. 28, 2010 in PCT/FR10/051369 filed on Jun. 30, 2010.

U.S. Appl. No. 13/386,042, filed Jan. 20, 2012, Nikolovski.

* cited by examiner

METHOD AND DEVICE FOR LOCATING AT LEAST ONE TOUCH ON A TOUCH-SENSITIVE SURFACE OF AN OBJECT

BACKGROUND (1) Field

This invention relates to a method for locating at least one touch on a touch-sensitive surface of an object. It also relates to a device for implementing this method.

(2) Description of the Related Art

There are many known objects that have a touch-sensitive surface, including mobile phones and other portable personal digital assistance devices. Their touch-sensitive interface is usually a flat rectangular screen with which a user can interact using a stylus or one or more fingers. Note, however, that the invention relates more generally to any type of object having a touch-sensitive surface that is not necessarily flat or rectangular in shape.

Each of these objects implements a method for locating at least one touch using one or more detection techniques.

The international patent application published under number WO 2006/133018 discloses a method for locating a touch on a touch-sensitive surface implementing multiple independent detection techniques, each providing an estimated location and comprising a step for cross-checking the estimates provided according to the various techniques in order to obtain a final result with improved accuracy. Among the considered techniques, one uses the repeated transmission in the touch-sensitive surface of elastic mechanical waves, such as surface acoustic waves, and the detection of these elastic mechanical waves to locate a touch by analyzing the interference of this touch on the detected waves. Because the implementation of this considered technique in this document does not provide a highly accurate estimate, it is advantageously combined with other techniques in order to refine the estimate. However, the multiplication of location techniques used slows down the processing of the sensed signals.

A method for locating using only one detection technique and analysis of detected signals is preferred. In particular, the invention more specifically relates to a method implementing only one technique for locating by analyzing the interference of a single or multiple touch on the propagation of elastic mechanical waves in a touch-sensitive surface, making it possible for it to provide an accurate estimate.

The invention therefore applies to a method for locating at least one touch on a touch-sensitive surface of an object that comprises the following steps:

monitoring of at least one touch by propagating, in the touch-sensitive surface of the object, elastic mechanical waves from at least one transmitting point of the object, and by detecting said elastic mechanical waves in at least one reception point of the object, in order to obtain at least one sensed signal, and locating at least one touch on the touch-sensitive surface of the object by comparing certain characteristics of the sensed signal to a set of reference characteristics.

Such a method is described in the international patent application published under the number WO 2008/142345. It provides for an accurate location by propagating waves having multiple frequency components corresponding to vibratory natural frequencies of the object. The propagation of these waves over a period of time in the touch-sensitive surface can identify patterns of vibration with different wavelengths, including resonance figures of bending modes. These have the characteristic of being more highly disrupted than resonance figures of modes of vibrations in the plane of the touch-sensitive surface of the object, so that the cushioning generated by a finger in contact with the surface, even if it is thick, varies significantly from one normal mode to another, and from one position of contact to another. It is then possible to locate a touch by a learning method, once a sufficient number of resonance figures are identified on the surface of the object.

However, many problems are not resolved by this method, such as recognizing, locating, and interpreting a multiple touch. Document WO 2008/142345 shows that the cushioning is not necessarily a linear function of the cover surface (except to choose a subspace of resonance modes), and when it is a linear function of the cover surface, it does not indicate whether it is always possible to locate a touch. Moreover, for cushioning to be a linear function of the contact surface, the energy must be evenly distributed on the surface of the object. In this case, however, there would no longer be any resonance, vibrational nodes, or vibrational antinodes. There would no longer be anything to distinguish the position of a touch.

There are other known methods for recognizing and/or interpreting multiple touches.

The international patent application published under number WO 2005/114369 describes, for example, a transparent touch-sensitive screen on which multiple touches are detected using a capacitive technology. This technology, however, has the drawback of requiring a transparent layer of electrodes and an array of capacitive sensor nodes.

The international patent application published under number WO 2008/085785 describes another example of a method for identifying and distinguishing the nature of a multiple contact (thumb, palm) by an analysis consisting of segmenting the obtained touch-sensitive image and identifying the discretized pattern using predefined models. This method has the drawback of requiring a discretized touch-sensitive interface.

The international patent application published under number WO 2008/085759 describes another example of a method for merging data from an interface with multiple touches. However, this method requires at least one secondary device and data synchronization from multiple devices.

Finally, the international patent application published under number WO 2008/085784 describes a touch-sensitive screen device that uses a dictionary of gestures that associates multiple touch to functions. However, the implemented method requires a comparison with all of the predefined elements in order to recognize a movement, and it only takes into account basic parameters of the multiple touches.

Another problem associated with the method described in document WO 2008/142345 resides in the high selectivity of the resonance figures and in the fact that it is then necessary to have a good frequency resolution in order to measure an amplitude at resonance peaks or at least to be able to carry out an interpolation to extrapolate the value of a resonance peak with or without contact. However, this method is highly accurate only with resonance figures. By working outside of the object's vibratory natural frequencies, it is possible to also obtain a stationary state of propagation in the touch-sensitive surface, but the obtained figures are much less discriminating.

Yet another problem associated with this method resides in the time to establish a stationary state of propagation in the touch-sensitive surface, as required to obtain the resonance figures. This time lengthens the processing time for locating a touch.

It may therefore be desirable to provide a method for locating at least one touch on a touch-sensitive surface of an object that overcomes at least some of the problems and constraints mentioned above.

BRIEF SUMMARY

The purpose of the invention is therefore a method for locating at least one touch on a touch-sensitive surface of an object that comprises the following steps:
  monitoring of at least one touch by propagating, in the touch-sensitive surface of the object, elastic mechanical waves from at least one transmitting point of the object, and by detecting said elastic mechanical waves in at least one reception point of the object, in order to obtain at least one sensed signal, and
  locating at least one touch on the touch-sensitive surface of the object by comparing certain spectral characteristics of the sensed signal to a set of reference characteristics,
in which the monitoring step comprises measuring the sensed signal during a time interval starting during a transient phase of the propagation of the transmitted waves, for supplying, to said at least one reception point, information on radiation interfered with by said at least one touch.

Note that the transient phase can last from the moment of excitation, marking the start of the transmission of elastic mechanical waves, until the time of the first reflections on the edges of the touch-sensitive surface of the object.

The invention proceeds with an approach that is very different than the traditional approaches that use the propagation of elastic mechanical waves. Surprisingly, it appears that, by using not the establishment of stationary resonance figures but the propagation of elastic mechanical waves in the touch-sensitive surface during the preliminary propagation transient phase, especially considering pulsed diffraction phenomena, it also senses signals that may distinguish the location of a single or multiple touch. In addition, it was observed that, by doing this, we are not dependent on the natural frequencies of the object, thereby overcoming the problem of resonance peak selectivity and stability. This also allows a much broader choice of frequencies.

Therefore, instead of obtaining and observing stationary figures, such as resonance figures, we obtain transient radiation figures, normally described as "pulsed diffraction figures", characteristic of a propagation interfered by a single or multiple touch. Note also that these transient figures can be obtained much more quickly than stationary figures, such that the processing of sensed data to obtain the location of the single or multiple touch is accelerated. These transient figures are also dependent on excitation frequencies, regardless of whether they are natural frequencies of the object or not.

Moreover, it will also be noted that what is measured is not necessarily a reduced vibration due to the presence of a touch on the touch-sensitive surface, but a signal that increases or decreases according to whether the presence of the single or multiple touch increases or decreases the exposure of the area containing the receiver(s).

Optionally, the measurement of the sensed signal extends beyond the establishment of a stationary phase of the propagation of the transmitted waves, for providing illumination information to said at least one receiving point.

Also optionally, said reference characteristics correspond respectively to single or multiple touches in predetermined areas of the touch-sensitive surface.

Also optionally, the transmitted waves comprise a plurality of predetermined frequency components that are all distinct from the vibratory natural frequencies of the object.

Also optionally, each frequency component of the transmitted waves is selected so as to be at a frequency distance that is twice the width of a resonance energy peak corresponding to any vibratory natural frequency of the object.

Also optionally, the characteristics of the sensed signal compared to the reference characteristics are spectral amplitudes of the sensed signal at said predetermined frequency components, forming a "measured" vector, and the set of reference characteristics comprises a set of reference vectors that are each associated with a single or multiple touch, this reference set being constructed during a preliminary training step, similar to the monitoring step, during which various single and multiple reference touches are measured.

Also optionally, because the reference vectors are ordered in the reference set by the value of their norm, the location step comprises the following substeps:
  calculate the norm of the measured vector,
  select a subset from the reference set that represents a range of norms in a predetermined vicinity of the norm of the measured vector, and
  search for the closest reference vector to the measured vector in this subset using a predetermined distance function.

The invention also relates to a device for locating at least one touch on a touch-sensitive surface of an object, comprising at least one transducer designed to transmit and receive elastic mechanical waves propagated in the touch-sensitive surface of the object and one central processing unit, connected to said at least one transducer, programmed:
  to propagate elastic mechanical waves in the touch-sensitive surface of the object from said at least one transducer and to detect said elastic mechanical waves by said at least one transducer in order to obtain at least one sensed signal, and
  to locate at least one touch on the touch-sensitive surface of the object by comparing certain spectral characteristics of the sensed signal to a set of reference characteristics,
in which the central processing unit is further programmed to measure the sensed signal during a time interval starting during a transient phase of the propagation of the transmitted waves, for supplying, to said at least one reception point, information on radiation interfered with by said at least one touch.

Optionally, a device for locating at least one touch on a touch-sensitive surface according to the invention further comprises the object, its touch-sensitive surface, and means for holding the touch-sensitive surface onto the object, arranged in the vicinity of discontinuous convex areas on the periphery of the touch-sensitive surface.

Also optionally, the central processing unit is further designed to:
  define at least one single or multiple tracing from a plurality of touches successively located on the touch-sensitive surface,
  interpret this single or multiple tracing as a predetermined function to execute by comparing some of the characteristics of said tracing to a set of reference characteristics.

BRIEF DESCRIPTION OF THE DRAWINGS

The invention will be better understood using the following description, given purely as an example and referring to the accompanying drawings, in which.

DETAILED DESCRIPTION

Figure 1:
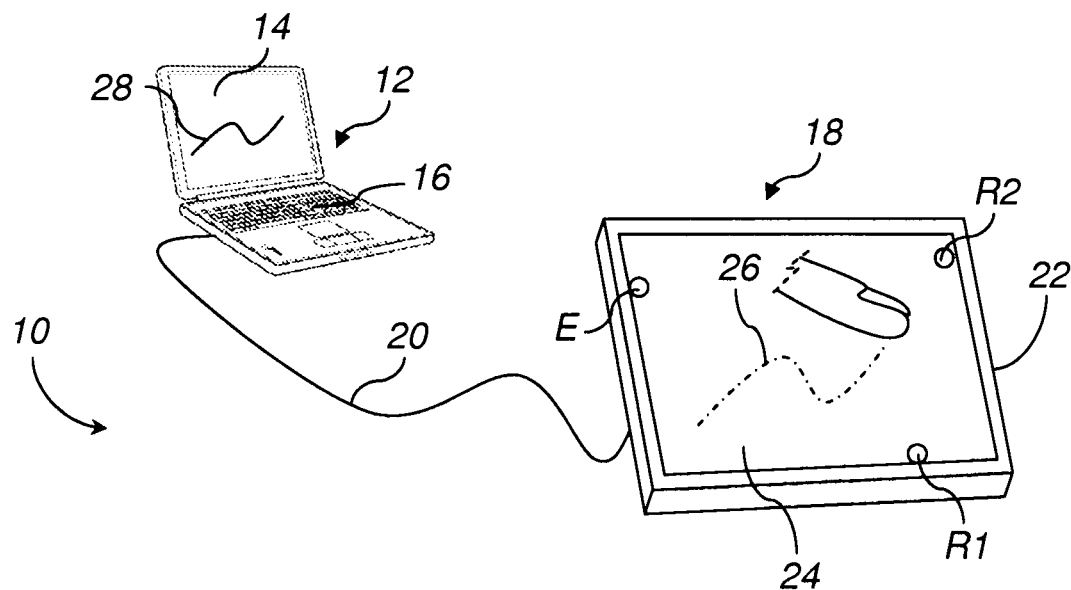
FIG. 1 schematically shows a perspective view of a device for locating at least one touch on a touch-sensitive surface of an object, according to a first embodiment of the invention, FIG. 2 schematically shows a perspective view of a device for locating at least one touch on a touch-sensitive surface of an object, according to a second embodiment of the invention, FIG. 3 schematically show the functional structure of the device in FIG. 1 or 2.

The device 10 for locating at least one touch on a touch-sensitive surface of an object, shown in FIG. 1, comprises:
    a microcomputer 12 comprising a screen 14 and a keyboard 16,
    an interactive tablet object 18, connected to the microcomputer 12 by a wired or wireless connection 20.

The interactive tablet 18 comprises a frame 22 and a touch-sensitive surface 24 held in place by the frame on at least a portion of its edges. The touch-sensitive surface 24 is presented, for example, in the form of a plate made of metal, glass, or plastic, which vibrates when elastic mechanical waves are propagated in its depth. It may be rectangular, such as in 4:3 format. Specifically, it can have a length of 100 mm and a width of 75 mm, and it can be relatively thin compared to its length and its width, namely between 100 µm and 4 mm, such as 450 µm. This thickness is also very low compared to the characteristic size of an area of the touch-sensitive surface 24 that can be touched, a user's finger usually representing a touch with a diameter of about one centimeter.

In the example illustrated in FIG. 1, three piezoelectric transducers E, R1, and R2 are attached to the inner face of the touch-sensitive plate 24, meaning that it is not accessible to touch and oriented toward the inside of the frame 22. Specifically, they can be adhered to the plate 24, by means of a conductive epoxy or cyanoacrylate adhesive.

These piezoelectric transducers are, for example, transducers made using PZT ferroelectric ceramics. They comprise:
    one transmitting transducer E, capable of transmitting elastic mechanical waves (i.e. acoustic waves in the broad sense) in bending modes, such as antisymmetric Lamb waves, such that they are propagated in the touch-sensitive plate 24,
    two receiving transducers R1 and R2, capable of capturing elastic mechanical waves propagating in bending modes in the touch-sensitive plate 24.

These three transducers are preferably located outside of any line of symmetry of the touch-sensitive plate 24. Moreover, they can be small and of any geometric shape. Specifically, for a touch-sensitive plate 24 with the indicated dimensions (75 mm×100 mm×0.45 mm), they may have a surface area between a few square millimeters and one square centimeter. If the transmitting transducer E is excited by a 10 V signal, the receiving signals provided by the receiving transducers R1 and R2 can reach 0.2 V without amplification.

The transducers E, R1, and R2 are connected to a control central processing unit, for instance integrated into the microcomputer 12 and programmed to:
    have elastic mechanical waves from the piezoelectric transducer E propagated in the touch-screen plate 24 and have these elastic mechanical waves detected by the piezoelectric transducers R1 and R2 in order to obtain two sensed signals, and
    locate at least one touch on the touch-sensitive surface 24 by comparing certain characteristics of the sensed signals to a set of reference characteristics.

Figure 6:
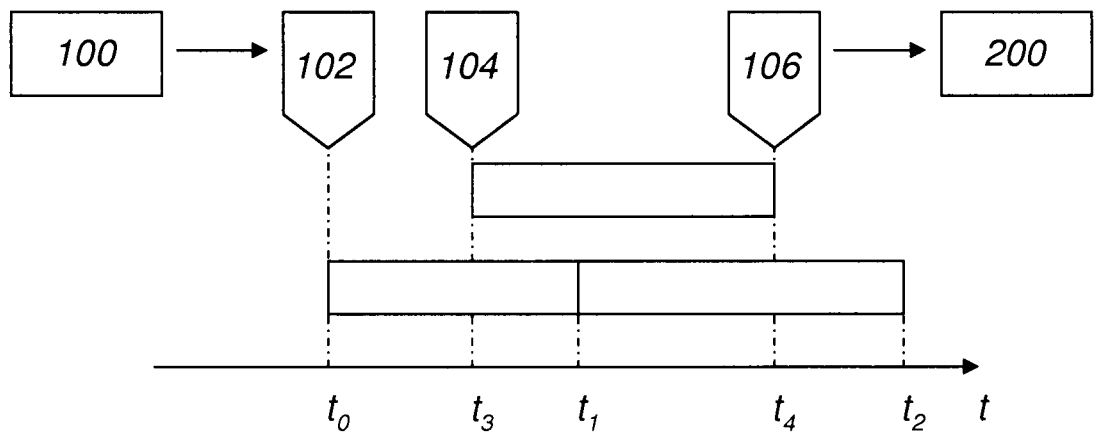
FIG. 6 illustrates the successive steps of a method for locating at least one touch on a touch-sensitive surface of an object, according to one embodiment of the invention.

According to a first aspect of the invention, the central processing unit of the microcomputer 12 is more specifically programmed to measure the sensed signals during a time interval that begins during a transient phase of the propagation of the transmitted waves from the piezoelectric transducer E, to provide radiation information to the receiving points formed by the piezoelectric transducers R1 and R2, according to a method that will be detailed with reference to FIG. 6.

The elastic mechanical waves transmitted in the touch-sensitive plate 24 from the piezoelectric transducer E are indeed locally absorbed, blocked, or partially reflected when at least one finger or stylus is in contact with the plate. This generates an interference in the radiation information provided to the receiving points R1 and R2 during the propagation transient phase. By extracting for example some amplitude and phase parameters at predetermined frequencies from this interfered radiation information, or "interfered diffraction response pulse", it is possible to compare them to reference parameters extracted from a library of parameters related to predetermined touches or extracted using a modeling of the diffraction response pulse interfered by a single or multiple touch (such as a Kirchhoff-Sommerfeld formula in pulsed state) and to deduce a possible location of a single or multiple touch.

Thus, for each single or multiple touch on the touch-sensitive plate 24, using one or more fingers or a stylus, we obtain a location of this single or multiple touch that can be displayed on the screen of the microcomputer 12. By extension, for a series of single or multiple touches detected on the touch-sensitive plate 24, forming a single or multiple tracing 26, a location of this tracing 26 can be seen on the screen of the microcomputer 12, in the form of a kinematic curve 28 obtained by interpolating the detected tracing 26.

Figure 2:
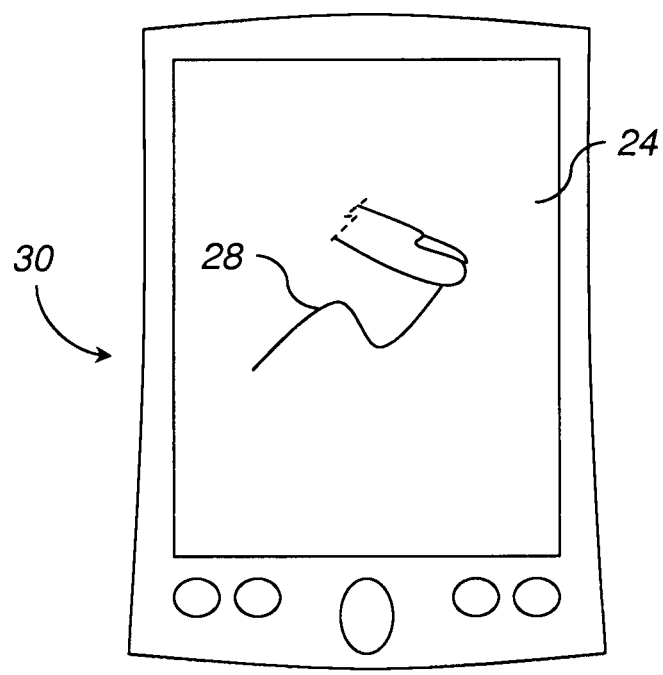

According to another embodiment of the invention shown in FIG. 2, the touch-sensitive plate 24 can be transparent and included in an embedded electronic device 30, such as a mobile phone or any other portable personal digital assistance device. In this case, it can also fulfill the function of a screen to display the kinematic curve 28 obtained by interpolation of the detected tracing 26.

Figure 3:
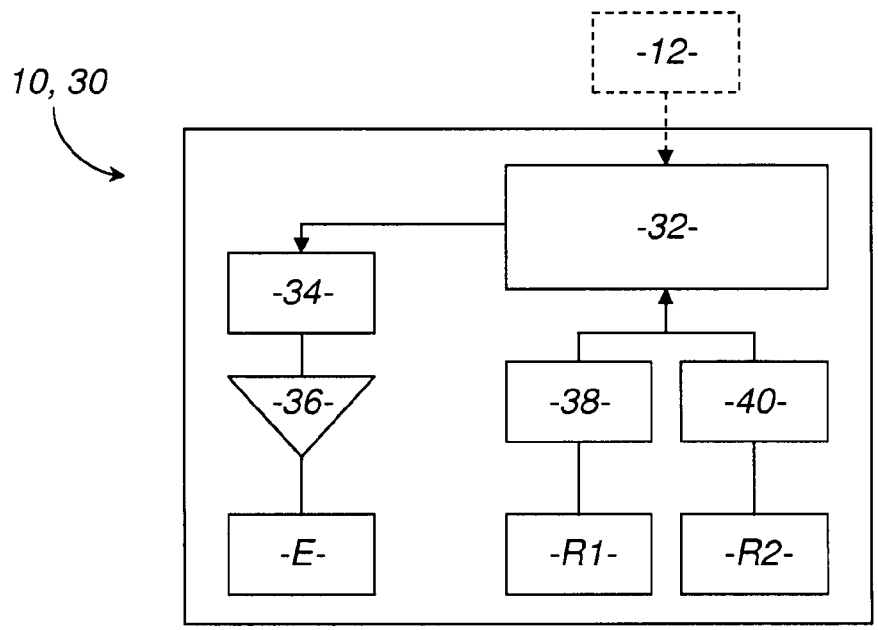

As shown in FIG. 3, the device 10 or 30 may comprise a microcontroller 32 with an arithmetic logic unit, possibly controlled by the microcomputer 12 in the case of the device 10. This microcontroller 32 comprises an output connected to a digital/analog converter 34 whose output is connected, if necessary via an amplifier 35, to the emission transducer E.

In addition, the two receiving transducers R1 and R2 can be connected to two analog/digital converters 38 and 40, themselves connected to or integrated with the microcontroller 32. The analog/digital converters 38, 40 and the microcontroller 32 are capable of performing a sampling of the signals captured on at least 8 bits, or preferably on 10 bits, 12 bits, or more, at a rate of at least 200 kHz.

According to one embodiment, or more specifically in the case of a test bench, the analog/digital and digital/analog converters can be replaced by an acquisition card and a generator of arbitrary functions.

The connections to the transducers E, R1, and R3 may be comprised specifically of coaxial audio cables or any other shielded connection.

Figure 4:
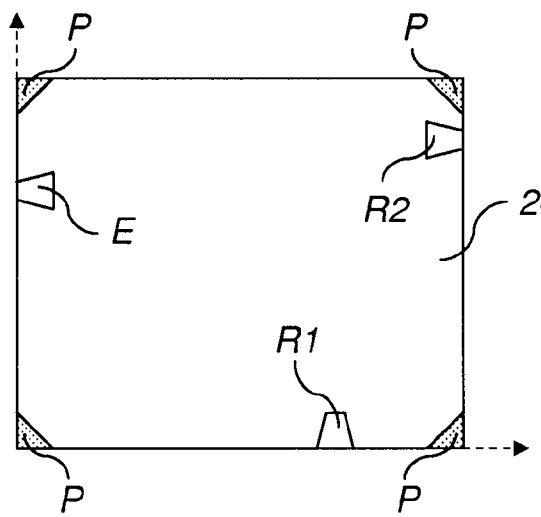
FIG. 4 shows a front view of a touch-sensitive screen of the device in FIG. 1 or 2, according to a first embodiment.

FIG. 4 shows a front view of a touch-sensitive plate 24 of the device in FIG. 1 or 2, according to a first embodiment. Shaped as a rectangle, the plate 24 is attached to the frame 22 at four roughly point-shaped areas P located in the four corners of the rectangle. These areas are the only things that impose mechanical stress on the plate. They are therefore preferably located in the places on the plate 24 that are the least affected by the propagation of elastic mechanical waves, specifically the corners at the edges of the plate.

Figure 5:
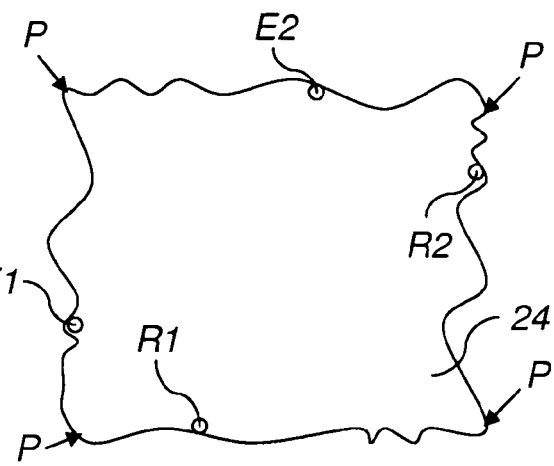
FIG. 5 shows a front view of a touch-sensitive screen of the device in FIG. 1 or 2, according to a second embodiment.

According to a second embodiment shown in FIG. 5, the plate 24 has a shape that is more complex than a rectangle. A first advantage of this more complex shape is that the radiation information in a propagation transient phase, or the diffraction information in a pulsed phase with the first reflections on the edges taken into account, may be more complex and can therefore distinguish the various possible locations of single or multiple touches. Usually indeed, in a solid object, and specifically with guided propagation, the vibratory energy includes longitudinal and transverse components whose proportions change according to the frequency. However, the reflection and acoustic modes conversion conditions at the limits of the solid object depend on the nature of the vibration such that the conditions of the acoustic illumination of the solid object in transient state and of accumulating vibratory energy during successive reflections in some areas of the object will depend on the excitation frequency, especially if the object has complicated contours and indentations (such as side dressing). Moreover, this more complex shape has more angular areas P where the radiation of the elastic mechanical waves is less significant and where the plate 24 can be attached to the frame 22 without interfering with its ability to locate a single or multiple touch.

Therefore, according to this invention, it may be advantageous to cut or mold the touch-sensitive surface of the object into a variable border or complex shape, such as a serrated edge, and preferably into a convex polygon for a plate, or oscillating at a variable rate, or in three dimensions.

Also, as part of the invention, more or less piezoelectric transmitting and/or receiving transducers may be provided, the minimum being a single successively transmitting and receiving transducer. In the non-exclusive example in FIG. 5, the decision was to have two transmitting transducers E1, E2 and two receiving transducers R1, R2.

The decision regarding the number of transducers and their mode of operation for the considered applications is guided by the following observations:
- the complexity of the radiation from the transmitted waves is increased by increasing the number of transmitting and/or receiving transducers, particularly when they are distributed in diametrically opposed areas,
- when multiple transducers alternately transmit the same frequencies, different radiations may be recorded.

The device 10 or 30 just described works in a way that will now be detailed with reference to FIG. 6.

At regular intervals, such as at a rate of several dozen measurements per second, specifically 50 to 100 measurements per second, the microcomputer 12 or the microcontroller 32 launches a step 100 to monitor the outer face of the touch-sensitive surface 24, followed by a step 200 to locate a single or multiple touch.

For each monitoring step 100, at an instant $t_0$, elastic mechanical waves are transmitted (102) in the plate 24. They are propagated according to two distinct propagation phases: a first transient propagation phase, extending from the instant $t_0$ to an instant $t_1$, during which the transmitted wave front reaches the receiver(s), either directly or indirectly after one or more reflections, while the addition of the received waves is not yet stable over time; a second stationary propagation phase, extending from the instant $t_1$ to an instant $t_2$ at the end of monitoring, during which the addition of new received waves is offset by the natural cushioning of the structure such that the amplitude of the peak-to-peak signal is stable over time. During the transient phase, it can be taken about a diffraction response pulse or, in a pictured way, about a radiation information received at the receiving point(s) according to a "flow" concept. During the stationary phase, it will be rather taken about an illumination information at the receiving point(s), according to a concept of stable result from this flow.

Following the transmission 102 of elastic mechanical waves in the plate 24, the monitoring step 100 comprises a detection 104 of these elastic mechanical waves in at least one receiving point of the plate 24 to obtain at least one sensed signal. This detection 104 is launched at an instant $t_3$ and continues until an instant $t_4$ of end of detection 106 by the measuring of the signal sensed during this time interval. According to the invention, the measurement begins during the transient phase of the propagation of the transmitted waves to provide radiation information to the receiving point(s). In other words, the instant $t_3$ for launching the measurement is between instants $t_0$ and $t_1$. The instant $t_4$ for ending the measurement can also be between instants $t_0$ and $t_1$ such that the measurement is fully realized during the transient phase. Alternatively, the measurement of the sensed signal can extend beyond the establishment of the stationary phase of the propagation of the transmitted waves, to provide illumination information at the receiving point(s) in addition to the indicated radiation information. In other words, the instant $t_4$ for ending the measurement can be between instants $t_1$ and $t_2$.

The monitoring step 100 is followed by a step 200 for locating a single or multiple touch during which a potential touch or multiple simultaneous touches on the touch-sensitive plate 24 can be identified and located.

These two monitoring 100 and locating steps 200 will now be detailed.

Monitoring Step 100

During each monitoring step 100, the microcomputer 12 or the microcontroller 32 has the transmitting transducer E, or the transmitting transducers E1, E2 arranged at potentially diametrically opposed points of the object (so as to vary the radiation figures), transmit elastic mechanical waves, such as Lamb waves and more specifically even antisymmetric Lamb waves. The transmitting transducer E, or the transmitting transducers E1, E2, do(es) not transmit simultaneously, but rather alternately so as to contrast the radiation and illumination figures (a simultaneous transmission would even out the radiation and illumination, removing the spatially discriminating characteristics). In addition to Lamb waves in isotropic plates, the transducer E, or the transducers E1, E2, is (are) capable of transmitting bending modes waves in homogeneous or heterogeneous flat or curved shells.

Also during this step, in an embodiment of the invention comprising multiple transmitters, these transmitters can all transmit together at least once in order to fully and evenly illuminate the touch-sensitive plate 24 in order to obtain a measurement whose norm is indicative of a single or multiple touch and of a cover surface.

The transmitted waves are comprised of a number Q of predetermined frequencies. They are sensed directly, or indirectly after one or more reflections, by the receiving transducers R1, R2 activated in the transient propagation phase. As indicated above, after multiple reflections on the edges of the touch-sensitive plate 24, stationary waves appear that are associated with illumination figures, which can also be sensed by the receiving transducers R1, R2.

The number Q of these predetermined frequencies is usually higher than 10 and preferably higher than 100, even between 200 and 500. These predetermined frequencies are not in the vicinity of a resonance peak of the object. They are even rather more than twice the width at mid-height (of energy) of a resonance peak, given that a resonance peak is located at any natural frequency of the touch-sensitive plate 24 integrated in the considered object. They may be chosen from the spectrum of signals sensed by the receiving transducers R1, R2. They are also chosen based on the complexity of the radiation information and/or of illumination figures that they generate. For example, the more complex and asymmetrical a resulting illumination and/or radiation figure, the more the corresponding frequency is interesting.

The predetermined frequencies can also be chosen based on a distribution of Q frequencies in a range of frequencies covering a broad spectrum from the point of view of spatial frequencies, particularly between 1 and 100 kHz. For example, for a range of frequencies from 20 kHz to 80 kHz, the distributed Q frequencies $Fi$ can be predetermined by the formula:

$$Fi = 20 + \frac{(80-20)i}{Q},$$

in kHz, for $1 \leq i \leq Q$.

To carry out the monitoring step 100 at the Q predetermined frequencies, the microcomputer 12 or the microcontroller 32 can have the transducer E or the transducers E1, E2 transmit a frame comprising Q overlapping waveforms at said Q predetermined frequencies. This transmission can be carried out during a transmission time window that is long enough to allow stationary waves to be constructed in the plate 24. This time can be between 2 and 25 ms, and particularly around 5 ms. This transmission can be carried out continuously or continuously repeated by generating an arbitrary signal, resulting from the overlapping of the Q frequencies on a time window of 5 ms.

During the monitoring step, the mechanical waves may be sensed by the receiving transducers R1 and R2 during a receiving time window, which can start after the transmitting time window in order to allow stationary waves to be established, or at the start of the transmitting time window in order to sense the acoustic radiation process in the object that is manifested when the direct signal is received and during the first successive reflections on the edges of the plate 24. It is therefore possible to obtain a signal measured in a few milliseconds, such as 5 or 2 ms. By comparison, according to the prior art disclosed in the document WO 2008/142345, such an acquisition window would only allow a frequency resolution of 500 Hz by a quick Fourier transform. Such a resolution would have been insufficient given the width of a resonance peak, of around 200 to 300 Hz.

Alternatively, if the transmission is intermittent, the receiving time window can start after the first transmission frame. Moreover, the receiving time window can follow the transmitting time window without overlapping it. In this case, only one piezoelectric transducer can be used for both transmitting and receiving. Also in this case, the receiving transducers are not involved in the stationary phase, in addition to the transient phase, but detect only a pure pulsed phase that comprises the acoustic extinction phase of the object.

From the signals sensed by the receiving transducers R1, R2 and sampled on an acquisition time window of length $T=t_4-t_3=N*Te$, where N is the number of acquisition points and Te is the sampling period, a frequency vector can be extracted by calculating a discrete Fourier transform:

$P_m=(A1_m, A2_m, \ldots Ai_m, \ldots AN_m)$, where m is an index identifying a receiving transducer from M receiving transducers in use.

Preferably, N is less than 2000, and the acquisition frequency is greater than 400 kHz.

The vector $P_m$ includes all of the amplitudes of the signal spectrum received at the frequencies included between Fe/N and the sampling receiving frequency Fe, with a frequency step of 1/T. Ai is the amplitude of the signal at a frequency Fi verifying the relationship $$Fi = \frac{iFe}{N},$$

for $1 \leq i \leq N$.

Finally, from the signals sensed by the receiving transducers R1, R2 that were sampled, an extended vector Pe= $\{P_1, \ldots, P_m\}$ can be formed, resulting from the merger of M vectors $P_m$.

Alternatively, the obtained vector or extended vector can contain only the amplitudes of the signal spectrum at frequencies between 20 kHz and 80 kHz.

Also alternatively, the obtained vector or extended vector can also contain only the amplitudes of the Q predetermined frequencies.

Also alternatively, the extracted characteristics may include the phases of the signal obtained by a Fourier transform.

Locating Step 200

During each locating step 200, the measured vector, such as at least one of the vectors $P_m$, is compared to reference vectors from a set of reference vectors $\{P_m\text{ref}(x_u,y_v,z_w)\}$ bijectively associated with a set of reference positions $\{(x_u, y_v, z_w)\}$ sampled on the surface of the touch-sensitive plate 24 in a Cartesian coordinate system (u,v,w). The nearest reference vector (given a predetermined distance) to the vector measured during the monitoring step 100 is selected and thus provides the coordinates of a touch.

The previous scores are relative to the detection of a single touch, but they can easily be extended to the location of a multiple touch or, in other words, the location of k simultaneous touches (k>1). More specifically, we deduce the k positions (x1,y1,z1, ..., xi,yi,zi, ..., xk,yk,zk) of k multiple touches associated with the measured vector $P_m$, from a search for the nearest reference vector (given a predetermined distance) to this measured vector in a set of reference vectors $\{P_m\text{ref}(x_{u1},y_{v1},z_{w1}, \ldots, x_{ui},y_{vi},z_{wi}, \ldots, x_{uk},y_vk,z_{wk})\}$ bijectively associated with a set of reference positions $\{(x_{u1},y_{v1}, z_{w1}, \ldots, x_{ui},y_{vi},z_{wi}, \ldots, x_{uk},y_vk,z_{wk})\}$ sampled on the surface of the touch-sensitive plate 24, in a Cartesian coordinate system (u,v,w).

There are various known forms of the distance function used during this locating step 200.

It can therefore be defined as a Manhattan distance:

$$d(P_m, P_m ref) = \sum_{i=1}^{N} |Ai_m - Ai_m ref|,$$

or as a Euclidian distance:

$$d(P_m, P_m ref) = \sqrt{\sum_{i=1}^{N} |Ai_m - Ai_m ref|^2},$$

or as a Minkowski distance:

$$d(P_m, P_m ref) = \sqrt[p]{\sum_{i=1}^{N} |Ai_m - Ai_m ref|^p},$$

where p is any integer,
or as a Chebyshev distance:

$$d(P_m, P_m ref) = \operatorname*{Max}_{i}(Ai_m - Ai_m ref).$$

It can have any other type of definition. Specifically, if the amplitudes from the signal spectrums received at Q predetermined frequencies are chosen to construct the measured vector, and if these amplitudes are centered and normalized, the calculation of the distance between the measured vector and the reference vectors is similar to the calculation of the cross-correlation function described in the above mentioned document WO 2008/142345.

In one embodiment of the invention, the chosen distance can be what gives the lowest location recognition error rate, this rate being evaluated during a preliminary step testing the various distances on a control set of random touches distributed on the touch-sensitive surface.

In one embodiment of the invention, to validate the recognition of a single or multiple touch, the M receivers must all identify the same single or multiple position of the touch during the locating step by a minimum distance search. The absence of a simultaneous recognition on the M receivers is then enough to reject the position. This merger of measures taken by the M sensors is simple and does not require complicated processing or any particular synchronization.

Alternatively, the M receivers can have different degrees of priority. There could thus be one primary receiving point and several secondary receiving points. The secondary receiving points can then enhance the measurement of the primary receiving point and result in multiple measured vectors that can be merged into a single extended vector.

In one embodiment of the invention, a touch is detected and searched for in the set of reference vectors if—and only if—both of the following criteria are simultaneously satisfied:

the norm of the measured vector comes out of a known stability range without a touch, and
the norm of the measured vector is in a range of possible variations of norms from the set of reference vectors.

The stability range is defined by a variation observed without any touch during a number of predetermined consecutive measurements. For example, the absolute value of the measured norm must deviate by more than 2% from the average value of the norm observed over 100 consecutive norms in order to consider it as being out of the range of stability.

In one embodiment of the invention, the likelihood of the identified position for the single or multiple touch is tested using two or three consecutive measurements. If the consecutive measurements result in the same position of a single or multiple touch, the identification is confirmed. Alternatively, to increase the responsiveness of the locating step 200, the test can be more permissive and tolerate only two or three measurements resulting in the same position, from a set of four or five consecutive measurements, as enough to confirm a location of a single or multiple touch.

In one embodiment of the invention, the elastic mechanical wave is propagated from multiple transmitting points. The consequence is that the reference set has an aggregated average norm or has a scatter range for the vector norm $P_m ref(x_u, y_v, z_w)$ that is less dependent on $(x_u, y_v, z_w)$.

Finally, in one embodiment of the invention, a touch-sensitive plate 24 is chosen that has a rather low reverberation constant, for example less than 10 ms at 1 kHz and 1 ms at 70 kHz, making it possible to have a higher measurement rate. This reverberation constant is defined as the period after which the residual signal following a pulse in the plate represents only 36% of the starting signal, i.e. a cushioning equal to $1/\exp(1)$.

As seen above, the locating step involves comparing at least one measured vector with a set of reference vectors. This set of reference vectors can be constructed during a preliminary learning step that will now be detailed.

This preliminary learning step can be carried out either for each touch-sensitive plate individually or for one standard touch-sensitive plate that is a representative sample of a series of touch-sensitive plates with the same dimensions and the same transducers adhered at the same positions and in the same manner, the plates themselves being integrated the same way into a supporting frame. The excitation of waves at frequencies other than the resonance frequencies is then an advantage because, even if the plates may appear to be identical, there may be a minor variation, such as air bubbles or a variation in the thickness of the glue, responsible for scattering the resonance frequencies for a series of plates considered to be identical.

The preliminary learning step is carried out like the monitoring step 100 described above, but in predetermined conditions of single or multiple touches which enable to obtain the above mentioned reference vectors, which are then used in the locating steps during regular use of the device with a touch-sensitive surface.

During this preliminary learning step, the reference vectors can be determined for single touches $\{P_m ref(x_u, y_v, z_w)\}$ or multiple touches $\{P_m ref(x_{u1}, y_{v1}, z_{w1}, \ldots, x_{ui}, y_{vi}, z_{wi}, \ldots, x_{uk}, y_v k, z_{wk})\}$ in the same way that the vector $P_m$ is determined in the monitoring step 100. These values, $\{P_m ref(x_u, y_v, z_w)\}$ or $\{P_m ref(x_{u1}, y_{v1}, z_{w1}, \ldots, x_{ui}, y_{vi}, z_{wi}, \ldots, x_{uk}, y_v k, z_{wk})\}$, correspond to frequency amplitudes from spectrums of sensed signals when there is one or more (k) touches on the touch-sensitive plate 24, at predetermined locations with the coordinates $\{(x_u, y_v, z_w)\}$ (single locations) or $\{(x_{u1}, y_{v1}, z_{w1}, \ldots, x_{ui}, y_{vi}, z_{wi}, \ldots, x_{uk}, y_v k, z_{wk})\}$ (multiple locations) sampled on the touch-sensitive plate, (u, v, w) being indices for the possible positions of a touch on the touch-sensitive plate 24 expressed in a three-dimensional reference frame.

Single or multiple reference touches can come from one or more artificial fingers, styluses, or even user fingers.

For a touch-sensitive surface that is divided into a 9×9 grid of discretized locations, 81 reference vectors will be needed to locate a single touch. For locating a double touch, $C_{81}^2=3240$ reference vectors will be needed. More generally, to locate k simultaneous touches (identical and interchangeable touches) on a sampling grid of U×V discretized locations, the required number of reference vectors is the number of combinations of k elements from a set of U×V elements, or $C_{U \times V}^k$.

According to one embodiment of the invention, for a more reliable final location, the preliminary step for learning a single or multiple touch can be repeated a number of times at a predetermined single or multiple position, retaining only an average value. For example, only the average value is kept out of ten identical learned values. The set of reference vectors is therefore constructed by averaging S successive acquisitions for each reference position (for example, S=10), with a certain standard deviation. Each reference vector can then be a complex vector, comprising, for each of its coefficients, a real portion indicating an average cushioning at the considered frequency and an imaginary portion indicating the standard deviation:

$$P_m \text{ref} = ((A1_m, \sigma1_m), \ldots (Ai_m, \sigma i_m), \ldots (AN_m, \sigma N_m)).$$

According to one embodiment of the invention, multiple reference vector sets can be used, each corresponding to a multiplicity k of touches. Specifically, there can be k reference vector sets, each comprising $C_{U \times V}^k$ reference vectors when the number of simultaneous interpretable touches can reach k.

It is then possible to combine these sets into a single reference set whose reference vectors are in ascending order by vector norm. By ordering the reference vectors like this in the reference set, it becomes possible to speed up the step for searching for the closest reference vector to the measured vector, such as by preselecting a limited range of possible norms from the reference set in a predetermined vicinity of the measured vector norm. The search is therefore limited to a reference subset. Moreover, the measured vector norm is indicative of the state of coupling the touch-sensitive surface with its environment. Specifically, one or more simultaneous touches on the touch-sensitive surface generate(s) a variation of the measured vector norm, such that it is strongly correlated to the number k of simultaneous touches.

According to a second aspect of the invention, the central processing unit of the device described above is further designed to:
  define at least one single or multiple tracing from a plurality of touches successively located on the touch surface, and
  interpret this single or multiple tracing by comparing some of its characteristics to a set of characteristics identifying single or multiple reference tracings.

More specifically, as indicated with reference to FIG. 1, for a series of single or multiple touches detected on the touch-sensitive plate 24, forming a single or multiple tracing 26, a location of this tracing 26 can be seen on the screen of the microcomputer 12, in the form of a kinematic curve 28 obtained by interpolating the detected tracing 26. The location of a single or multiple touch comprises indeed a set of steps whose total duration is less than 10 ms, or even 5 ms, and comprises a continually looping process such that the measurement rate can be increased and it is easier to obtain a single or multiple tracing.

The kinematic curve 28 can further be comprised of multiple segments, the last point of one segment and the first point of the following segment being characterized by a break in contact with the touch-sensitive plate 24 for a predefined minimum time, such as between 50 ms and 150 ms.

Interpreting successive single or multiple touches makes it possible, for example, to design an object with a touch-sensitive surface capable of:
  sampling a moving touch (i.e. a tracing),
  calculating the speed and acceleration of a moving touch,
  measuring the norm of a touch and establishing a correspondence between this norm and the force of the touch,
  identifying the start and end of a touch,
  tracing a kinematic curve by interpolating the tracing,
  establishing signatures for dynamic interactions with the touch-sensitive surface, such as the interactions for a swipe, a "single-click" tap, a "double-click" tap, or other actions for a single or multiple touch,
  designing and moving graphical objects from a computer operating system (ex. a CAD drawing, a photograph, a document, etc.) in a computer workspace (ex. the screen 14 or 24),
  designing, moving, or orienting an object in a virtual space based on the direction of the touch's movement,
  interpreting a touch based on its single or multiple tracing, its speed, and its acceleration in order to perform a function based on a predetermined gesture language (fast forward, fast backward, selection, zoom in, zoom out, rotate, free distort from k distortion points, etc.).

Figure 7:
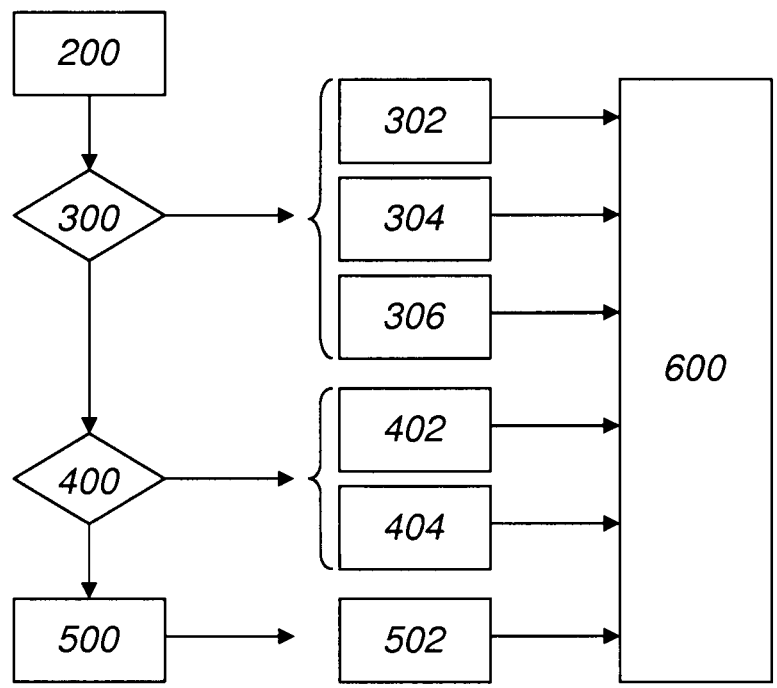
FIG. 7 illustrates the successive steps of a method for interpreting at least one touch on a touch-sensitive surface of an object, according to another aspect of the invention, FIG. 8 schematically shows various symbolic interpretations of various successive locations of single touches, and FIG. 9 schematically shows various symbolic interpretations of various successive locations of multiple touches.

FIG. 7 illustrates the successive steps of an example of a logical method for interpreting at least one touch on a touch-sensitive surface of an object, according to the second aspect of the invention.

This method first comprises the execution of multiple successive locating steps 200 resulting in the determination of a single or multiple tracing by the central processing unit.

Then, during a testing step 300, it is determined whether the tracing to be interpreted is single or multiple. If it is a single tracing, the context and characteristics of the tracing at one of the steps 302, 304, or 306 are used.

Figure 8:
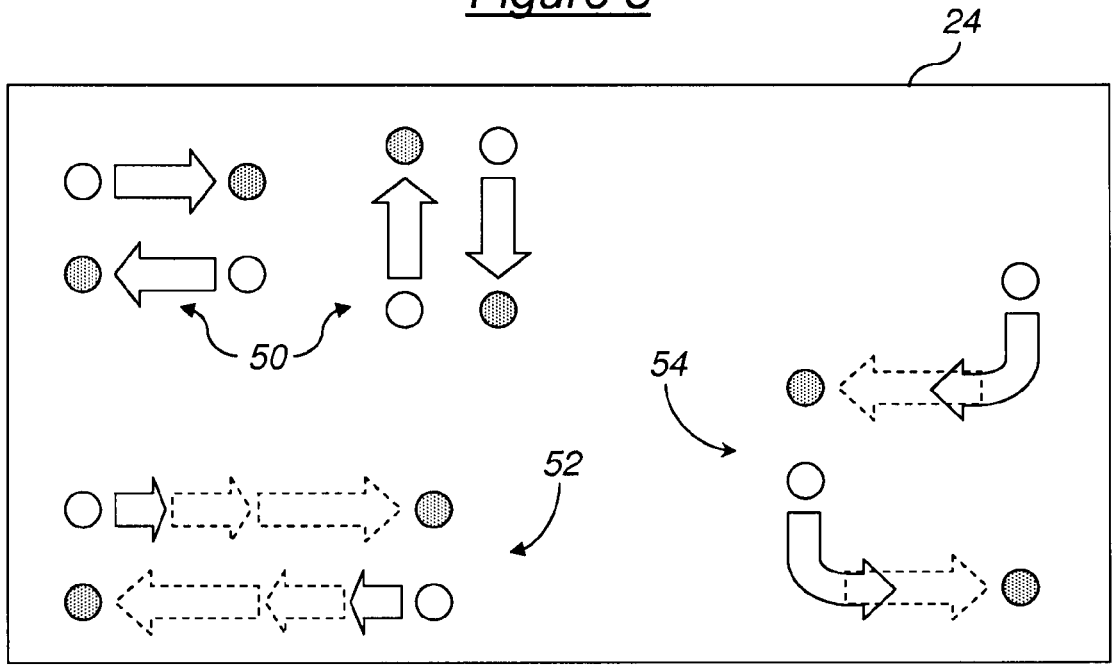

During the step 302, in the context of viewing an object in a virtual space and/or a workspace, a single tracing, such as one of the tracings marked with reference 50 in FIG. 8, is interpreted as a command to move the object, particularly if the initial touch of the tracing points to the object in question. The tracings shown in FIG. 8 are tracings (simple examples) of a movement to the right, to the left, up, and down, the white dot indicating the starting position (start of the tracing), and the gray dot indicating the ending position (end of the tracing).

During the step 304, in the context of viewing an object in a virtual space and/or a workspace or in the context of a list of any objects, a single tracing like one of the tracings marked with reference 52 in FIG. 8 is interpreted as a command to accelerate the movement of the displayed object or as a command to move fast forward or backward in the list. In this context, not only the direction of the tracing, but also its speed and/or acceleration are taken into account. Therefore, a tracing to the right with an acceleration is interpreted as a move fast backward, and a tracing to the left with an acceleration is interpreted as a move fast forward.

During the step 306, in the context of reading a document containing multiple pages, a single tracing, like one of the tracings marked with reference 54 in FIG. 8, is interpreted as a command to return to the previous page or go to the next page. In this context too, not only the direction of the tracing, but also its speed and/or acceleration are taken into account. Therefore, a quarter-circle tracing with a straight acceleration at the end of the tracing is interpreted as a page turn, to the next or previous page, depending on the direction of the tracing.

If it is determined during the step 300 that the tracing to be interpreted is multiple, we continue to another testing step 400 to determine whether the tracing is a double tracing or whether it is more than two simultaneous touches. If it is a double tracing, we continue to one of the steps 402 or 404 according to the context and characteristics of the tracing.

Figure 9:
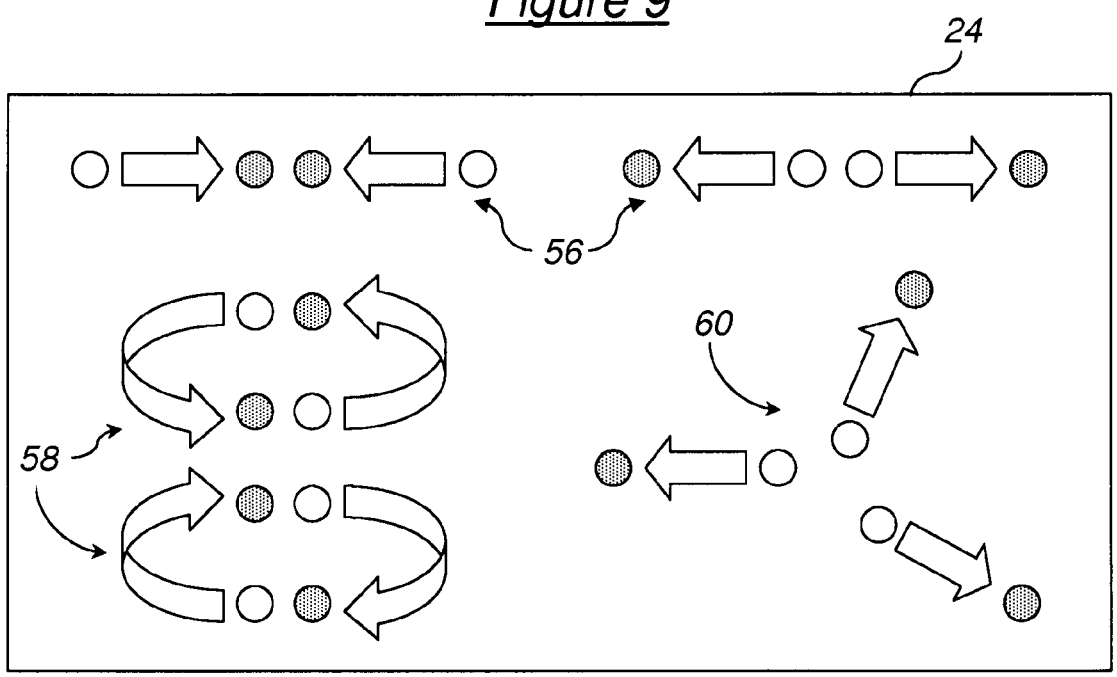

During the step 402, in the context of viewing an object in a virtual space and/or a workspace, a double tracing, such as one of the tracings marked with reference 56 in FIG. 9, is interpreted as a command to zoom in or out relative to the object, particularly if the initial double touch of the tracing points to the object in question. The amplitude of the zoom is determined based on the variation of the distance between the two simultaneous touches during the tracing. Traditionally, this zoom function is interpreted and displayed as a homothetic distortion command for the displayed object.

During the step 404, in the context of viewing an object in a virtual space and/or a workspace, a double tracing with two semi-circles, such as one of the tracings marked with reference 58 in FIG. 9, is interpreted as a command to rotate the object, particularly if the initial double touch of the tracing points to the object in question.

If it is determined during the step 400 that the tracing to be interpreted is more than two simultaneous touches, we continue to another step 500 to interpret a tracing with at least three simultaneous touches. In one embodiment of the invention, we then continue to a free distort step 502 for the object.

During this step 502, in the context of viewing an object in a virtual space and/or a workspace, an at least triple tracing, like the tracing marked with reference 60 in FIG. 9, is interpreted as a command to freely distort the object. Specifically, the tracing 60 is a triple tracing: it initially points for instance to three points of the object and moves these three respective points along the triple tracing and defines a vector deformation to be applied to the object.

Following steps 302, 304, 306, 402, 404, and 502, we continue to step 600 for executing the interpreted functions mentioned above and for displaying their result, such as on the screen 14 (for FIG. 1) or 24 (for FIG. 2).

Finally, note that the second aspect of the invention, described with reference to FIGS. 7, 8, 9, relating to interpreting a detected single or multiple touch, although advantageously combined with the first aspect described with reference to FIGS. 1 to 6, is separate from it in that any other method for the single or multiple location of a touch or tracing (as a series of touches) could be used for implementing the interpretation of the touch.

Clearly, a method of locating at least one touch on a touch-sensitive surface, like the one described above, can achieve a processing time that is significantly less than traditional methods by analyzing the likelihood of single or multiple touches during the propagation transient phase of elastic mechanical waves in the touch-sensitive surface by analyzing the effect of these touches on the radiation and/or illumination of the touch-sensitive surface. More specifically, where traditional methods required an acquisition time of up to 50 ms, this is divided by a factor of about ten. It is therefore possible to carry out a large number of measurements per second and to determine compatible tracings using the traditional drag-and-drop function.

Moreover, the processing is simple enough to be able to be implemented in commercial microcontrollers.

In addition, this method is not dependent on the natural frequencies of the object with a touch-sensitive surface and therefore does not need to be selective or stable in the studied frequencies. Specifically, it does not require the object's resonance frequencies to be activated when the object is very thin as compared to the wavelength of the transmitted waves and the characteristic size of a finger. It is therefore compatible with touch-sensitive plates that are thin (less than one millimeter) and highly cushioned, as may be the case for the upper plate (user side) of an LCD or plastic shell. Moreover, this leaves a significantly larger choice of usable frequencies for the analysis of radiation and/or illumination figures.

Another advantage is the ability to obtain satisfactory results, for example an accurate millimeter location, from a small number of transmitters and sensors. Specifically, at a minimum, a single transducer, successively a transmitter and receiver, is enough. Two transmitters and two receivers arranged asymmetrically on the periphery of the touch-sensitive surface provide very good estimates. Moreover, these transmitters/receivers can be small, such as only a few square millimeters.

As seen above, it is also possible to distinguish a single touch and a multiple touch.

Another advantage is also being able to integrate the touch-sensitive plate in a frame using attachment points (such as gluing) that are involved (without disrupting) in the construction of discriminating radiation and/or illumination figures.

It has also been shown that the invention is not limited to flat glass surfaces, but instead applies also to curved surfaces and plastic or metal shells, which increases the possible applications. It is especially true that the method described above benefits from touch-sensitive surfaces with complex and irregular contours for forming discriminating radiations and illuminations based on touches.

Finally, according to the second aspect of the invention, the method described above makes it possible to create a language or touch-sensitive gestures that can interpreted into functional commands, just like a keyboard shortcut, but in a more intuitive way.

Some possible industrial applications of devices and the method described above include specifically but not exhaustively:

touch-sensitive displays using multiple touches for video game consoles, mobile phones, personal digital assistance devices, and LCD screens, in the context of a user interface that dynamically interprets single and multiple touches, flat or curved touch-sensitive keyboards, touch-sensitive control buttons arranged onto objects with complex shapes, touch-sensitive shells for robots, capable of perceiving various kinds of touches, including swipes, hits, etc.

Also note that the invention is not limited to the embodiment described previously. As is known to those skilled in the art, there are various modifications that can be made to the embodiment described above, with respect to the instruction that has been disclosed. In the following claims, the terms used should not be interpreted as limiting the claims to the embodiment presented in this description, but should be interpreted to include all of the equivalents that the claims intend to cover by their formulation and whose projection is within reach of those skilled in the art by applying their general knowledge to the instruction that has just been disclosed.

The invention claimed is:

1. A method for locating at least one touch on a touch-sensitive surface of an object, comprising:

monitoring of at least one touch by propagating, in the touch-sensitive surface of the object, elastic mechanical waves from at least one transmitting point of the object, and by detecting said elastic mechanical waves in at least one reception point of the object, in order to obtain at least one sensed signal, and locating at least one touch on the touch-sensitive surface of the object by comparing certain spectral characteristics of the sensed signal to a set of reference characteristics, the set of reference characteristics including interfered radiation information for predetermined single or multiple touches received during a transient phase of the propagation of the transmitted waves when resonances have not been established in the touch-sensitive surface and the transmitted waves are not stable over time, wherein the monitoring step comprises starting to measure the sensed signal during a time interval starting during the transient phase of the propagation of the transmitted waves, for supplying, to said at least one reception point, information on radiation interfered with by said at least one touch, such that the locating of the at least one touch on the touch-sensitive surface includes a comparison of certain spectral characteristics of the sensed signal measured during the transient phase to the interfered radiation information included in the set of reference characteristics.

2. A method for locating a least one touch on a touch-sensitive surface according to claim 1, in which the measurement of the sensed signal extends beyond the establishment of a stationary phase of the propagation of the transmitted waves, to provide illumination information to said at least one receiving point.

3. A method for locating at least one touch on a touch-sensitive surface according to claim 1 or 2, in which said reference characteristics correspond respectively to single or multiple touches in predetermined areas of the touch-sensitive surface.

4. A method for locating at least one touch on a touch-sensitive surface according to claim 1, in which the transmitted waves comprise a plurality of predetermined frequency components that are all distinct from the vibratory natural frequencies of the object.

5. A method for locating at least one touch on a touch-sensitive surface according to claim 4, in which each frequency component of the transmitted waves is selected so as to be at a frequency distance that is twice the width of a resonance energy peak corresponding to any vibratory natural frequency of the object.

6. A method for locating at least one touch on a touch-sensitive surface according to claim 4 or 5, in which the characteristics of the sensed signal compared to the reference characteristics are spectral amplitudes of the sensed signal at said predetermined frequency components, forming a "measured" vector, and the set of reference characteristics comprises a set of reference vectors that are each associated with a single or multiple touch, this reference set being constructed during a preliminary training step, similar to the monitoring step, during which various single and multiple reference touches are measured.

7. A method for locating at least one touch on a touch-sensitive surface according to claim 6, in which, the vectors are ordered in the reference set by the value of their norm, and the location step comprises the following substeps:

calculate the norm of the measured vector, select a subset from the reference set that represents a range of norms in a predetermined vicinity of the norm of the measured vector, and search for the closest reference vector to the measured vector in this subset using a predetermined distance function.

8. A device for locating at least one touch on a touch-sensitive surface of an object, comprising:

at least one transducer designed to transmit and receive elastic mechanical waves propagated in the touch-sensitive surface of the object; and one central processing unit, connected to said at least one transducer, configured:

to propagate elastic mechanical waves in the touch-sensitive surface of the object from said at least one transducer and to detect said elastic mechanical waves by said at least one transducer in order to obtain at least one sensed signal, and to locate at least one touch on the touch-sensitive surface of the object by comparing certain spectral characteristics of the sensed signal to a set of reference characteristics, the set of reference characteristics including interfered radiation information for predetermined single or multiple touches received during a transient phase of the propagation of the transmitted waves when resonances have not been established in the touch-sensitive surface and the transmitted waves are not stable over time, wherein the central processing unit is further configured to start to measure the sensed signal during a time interval starting during the transient phase of the propagation of the transmitted waves, for supplying, to said at least one reception point, information on radiation interfered with by said at least one touch, such that the central processing unit is configured to locate of the at least one touch on the touch-sensitive surface includes based on a comparison of certain spectral characteristics of the sensed signal measured during the transient phase to the interfered radiation information included in the set of reference characteristics.

9. A device for locating at least one touch on a touch-sensitive surface according to claim 8, further comprising the object, its touch-sensitive surface, and means for holding the touch-sensitive surface onto the object, arranged in the vicinity of discontinuous convex areas on the periphery of the touch-sensitive surface.

10. A device for locating at least one touch on a touch-sensitive surface according to claim 8 or 9, in which the central processing unit is further configured to:

define at least one single or multiple tracing from a plurality of touches successively located on the touch-sensitive surface, interpret this single or multiple tracing as a predetermined function to execute by comparing some of the characteristics of said tracing to a set of reference characteristics.

* * * * *